Jan. 2, 1968  H. SCHARBACH ET AL  3,361,588
COMPOSITE DEVITRIFIED-VITRIFIED ENAMEL COATING
Filed Dec. 7, 1964
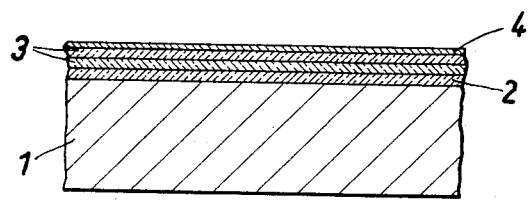
Heinz Scharbach
Rudi Horsch
Inventors
Wenderoth, Lind and Ponack
Attorneys

United States Patent Office 3,361,588
Patented Jan. 2, 1968

---

3,361,588
COMPOSITE DEVITRIFIED-VITRIFIED ENAMEL COATING
Heinz Scharbach, 9 Joseph-Fleuchaus-Strasse, Plankstadt, near Schwetzingen, Germany, and Rudi Horsch, 4 Breslauer Strasse, Schwetzingen, Germany,
Filed Dec. 7, 1964, Ser. No. 416,265
Claims priority, application Germany, Dec. 11, 1963, P 33,171
3 Claims. (Cl. 117—70)

The invention relates to a composite material consisting of a base and several layers forming a protective coating fused on to the same.

It is already known to provide metals, particularly steel, with cover coats of porcelain enamel which apart from being chemically stable also possess good surface properties, such as smoothness, gloss and abrasion resistance.

Coatings on metals of crystallised (devitrified) porcelain enamel which are superior to ordinary enamels in strength, temperature and impact resistance are likewise known, but they are inferior to cover coat enamels in the matter of chemical stability and surface quality.

The object of the present invention is to combine the advantages afforded by both types of enamel on a base material.

According to the invention this is achieved by providing a metal base with a protective enamel coating consisting of at least one layer of crystallised vitreous enamel and at least one layer of a cover coat enamel applied to the crystallised enamel.

According to the nature of the base and the properties desired in the finished composite, several possibilities of performing the invention offer themselves.

The base may be sheet metal, hollow ware or cast ware, including solid cast ware. The base material may, without excluding other materials, be a carbon steel, an alloyed steel or a non-ferrous metal.

The protective coating may consist of a porcelain enamel ground coat, an intermediate enamel coating transformed into the crystalline state and an outer porcelain enamel cover coat.

However, the protective coating may also dispense with the ground coat and consist of one or more layers of crystalline enamel and a cover coat of porcelain enamel of vitreous structure.

The enamel compositions useable to form the various layers in the coating include those known to the art, which recognises a wide range of suitable compositions, and suitable methods of applying these layers will also readily occur to those skilled in the art.

The accompanying drawing illustrates a section through an exemplary composite prepared in accordance with the invention.

A steel base 1 is provided with an enamel ground coat 2 of vitreous structure upon which one or more intermediate layers of an enamel 3 are stoved. Here two layers 3 are shown and the enamel subsequently devitrified (crystallised) by suitable treatment. The final layer 4 is a glazing layer of enamel cover coat of vitreous structure.

The protective coating may also be so contrived that both the ground coat 2 and the layer or layers 3 consist of crystallised enamel covered with a final layer 4 of a cover coat enamel of vitreous structure stoved on to the same.

Alternatively, the ground coat may be omitted and a layer 3 of crystallisable enamel applied directly to the metal base 1. A cover coat of vitreous structure may then be stoved on to the enamel layer 3.

According to requirements and purpose any desired number of enamel layers may be used in the production of a composite according to the invention which exhibits qualities of resistance to mechanical and chemical attack that are superior to those obtainable by use of a crystallised or a vitreous enamel alone. Many compositions for the enamels in the various layers and methods for applying these layers to produce a composite in accordance with the invention are known to the art.

It is also to be understood that suitable modifications may be made within the spirit and scope of this invention to the exemplary structure as disclosed.

We claim:

1. A porcelain enamel composite comprising a metal base and an enamel protective coating of at least one layer of a crystallised enamel and at least one layer of a vitrified cover coat enamel, said layers being applied and fused in succession in the order stated.

2. A porcelain enamel composite comprising a metal base and an enamel protective coating a layer of ground coat enamel, a plurality of layers of a crystallised enamel and a layer of a vitrified cover coat enamel, said layers being applied and fused in succession in the order stated.

3. A porcelain enamel composite comprising a metal base and an enamel protective coating consisting of a layer of ground coat enamel and an intermediate enamel layer, both layers being crystallised, and a layer of a cover coat enamel of vitreous structure, said layers being applied and fused in succession in the order stated.

References Cited

UNITED STATES PATENTS

| 2,542,043 | 2/1951 | McIntyre | 117—129 X |
| 2,851,376 | 9/1958 | Adlassnig. | |
| 3,275,358 | 9/1966 | Shonebarger | 117—129 X |

OTHER REFERENCES

Chemical Engineering, Oct. 3, 1960, pp. 130, 132, 134 relied upon.

ALFRED L. LEAVITT, *Primary Examiner.*

A. GOLIAN, *Assistant Examiner.*